United States Patent [19]

Matsushima et al.

[11] Patent Number: 5,453,788
[45] Date of Patent: Sep. 26, 1995

[54] APPARATUS FOR CONVERTING ENCODED DATA INTO IMAGE DATA, INCLUDING DATA PREPARING CIRCUIT, TO ALLOW ENLARGEMENT OR REDUCTION OF IMAGE

[75] Inventors: Makoto Matsushima, Minoo; Ryo Fukui, Toyonaka, both of Japan

[73] Assignee: Ricoh Company, Ltd., Tokyo, Japan

[21] Appl. No.: 194,179

[22] Filed: Feb. 9, 1994

[30] Foreign Application Priority Data

Feb. 10, 1993 [JP] Japan .................. 5-022797

[51] Int. Cl.$^6$ .................................................. H04N 7/12
[52] U.S. Cl. .................. 348/395; 348/403; 348/405; 382/246; 382/251
[58] Field of Search .................. 348/207, 240, 348/384, 395, 403, 405; 382/56; 358/432, 433

[56] References Cited

U.S. PATENT DOCUMENTS

| | | | |
|---|---|---|---|
| 4,782,397 | 11/1988 | Kimoto ................... | 358/256 |
| 4,963,981 | 10/1990 | Todaka et al. ........... | 348/240 |
| 4,984,076 | 1/1991 | Wanatabe et al. ....... | 348/405 |
| 5,073,820 | 12/1991 | Nakagawa et al. ...... | 348/405 |
| 5,107,345 | 4/1992 | Lee ........................ | 348/403 |
| 5,216,516 | 6/1993 | Tanaka et al. ........... | 358/426 |
| 5,227,875 | 7/1993 | Sun et al. ................ | 348/384 |

FOREIGN PATENT DOCUMENTS 293362 10/1992 Japan ................. H04N/1/41

Primary Examiner—Michael T. Razavi
Assistant Examiner—Bipin Shawala
Attorney, Agent, or Firm—Popham, Haik, Schnobrich & Kaufman, Ltd.

[57] ABSTRACT

An image processing apparatus includes: a first transforming device for transforming encoded data into discrete cosine transform coefficient data segmented into processing blocks, each block being formed of a matrix of m×n pixels; and a setting device for setting the values of M and N defining the size of a matrix forming each processing block used in inverse discrete cosine transform. The image processing apparatus also includes a data preparing circuit for adding discrete cosine transform coefficient data to, or deleting discrete cosine transform coefficient data from, a high-frequency domain of the discrete cosine transform coefficient data and segmented into processing blocks, each block being formed of a matrix of m×n pixels, and for preparing discrete cosine transform coefficient data segmented into processing blocks, each block being formed of a matrix of M×N pixels; a second transforming device for subjecting the discrete cosine transform coefficient data prepared by the data preparing circuit to inverse discrete cosine transform, so that image data can be output; and an outputting device for outputting image data output from the second transforming device and segmented into processing blocks as continuous image data.

1 Claim, 7 Drawing Sheets

INPUT SIGNAL

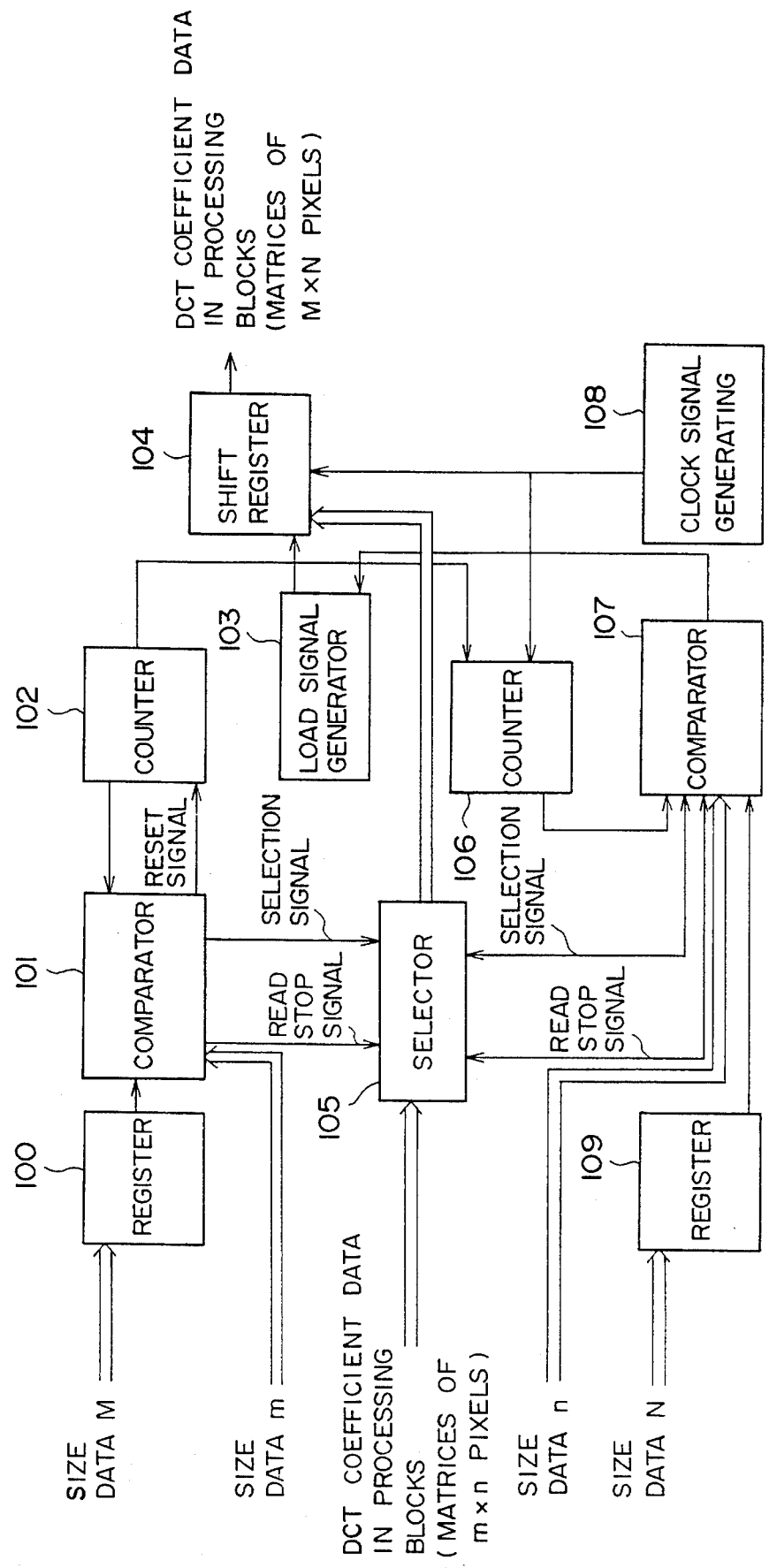

FIG. 7A
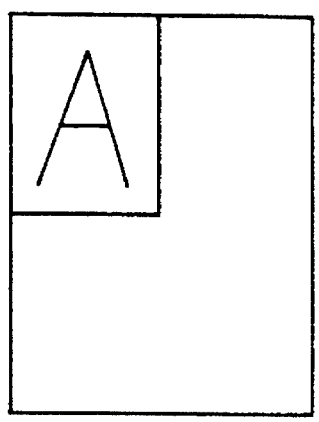  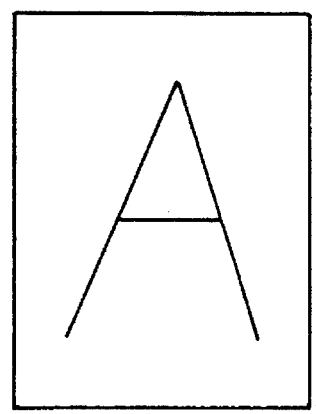
ORIGINAL IMAGE　　　　REPRODUCED IMAGE
FIG. 7B
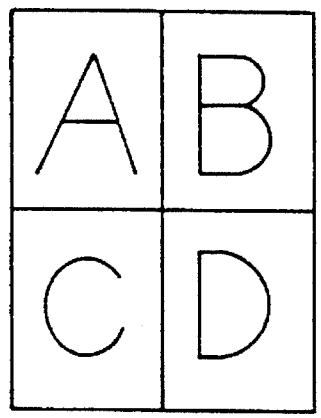  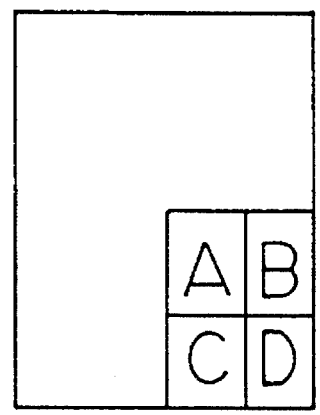
ORIGINAL IMAGE　　　　REPRODUCED IMAGE

APPARATUS FOR CONVERTING ENCODED DATA INTO IMAGE DATA, INCLUDING DATA PREPARING CIRCUIT, TO ALLOW ENLARGEMENT OR REDUCTION OF IMAGE

BACKGROUND OF THE INVENTION

The present invention relates to an image processing apparatus for encoding image data and decoding encoded image data, by using discrete cosine transform.

Conventionally, encoding of image data by using discrete cosine transform has been effected in the following manner. First, the image data are segmented into processing blocks, each block being formed of a matrix of m×n pixels, the image data segmented into processing blocks are subjected to orthogonal transform coding by using discrete cosine transform so that the image data are transformed into functions of spatial frequencies. Next, the discrete cosine transform coefficients (hereinafter, referred to as DCT coefficients) obtained by discrete cosine transform are quantized. Finally, the values of quantized DCT coefficients are encoded by means of Huffman coding.

FIG. 1 is a block diagram showing the functions of the encoding part for encoding image data by using discrete cosine transform. The encoding part comprises: an m×n pixel data extracting circuit 1 for extracting, from input image data, processing blocks of image data, each block being formed of a matrix of m×n pixels; an m×n pixel discrete cosine transform circuit 2 for subjecting the m×n processing blocks of image data extracted by the m×n pixel data extracting circuit 1 to discrete cosine transform; a quantizing circuit 3 for quantizing the DCT coefficients obtained by discrete cosine transform executed by the m×n pixel discrete cosine transform circuit 2; a Huffman coding circuit 4 for executing Huffman coding process by using the DCT coefficients quantized by the quantizing circuit 3.

FIG. 4a shows processing blocks 1, 2, . . . , i, i+1, . . . , j, . . . used in the encoding process, each block being formed of a matrix of 8×8 pixels. The upper half of FIG. 4b shows image data $x_0(m)$, $x_1(m)$, . . . for processing respective blocks 1, 2, . . . ; the lower half of FIG. 4b shows DCT coefficient data $X_0(k)$ and $X_1(k)$ obtained by subjecting the image data $x_0(m)$ and $x_1(m)$ to discrete cosine transform.

The m×n pixel data extracting circuit 1 segments a set of image data into processing blocks 1, 2, . . . , i, i+1, . . . , j, . . . , each block being formed of a matrix of 8×8 pixels, as shown in FIG. 4a, and outputs the image data segmented into processing blocks sequentially. The m×n pixel discrete cosine transform circuit 2 subjects the image data in processing blocks output from the m×n pixel data extracting circuit 1 to discrete cosine transform. It will be noted, by referring to the lower half of FIG. 4b, that the DCT coefficient data for the respective processing blocks are characterized by higher levels in the low-frequency component domain, and by lower levels in the high-frequency component domain.

The process for decoding the encoded data into the image data is reversed to the above encoding process, as indicated by the block diagram of FIG. 2. That is, the encoded data are subjected to Huffman decoding, the quantized DCT coefficients obtained by Huffman decoding are dequantized, and the DCT coefficient data obtained by dequantization are segmented into processing blocks, each block being formed of a matrix of m×n pixels. Thereafter, the segmented DCT coefficient data are subjected to inverse discrete cosine transform so as to obtain the image data, and the segmented image data are integrated into continuous image data.

Generally, when an image obtained by decoding the encoded data is enlarged or reduced, and output to a display unit or the like, the image data obtained by decoding the encoded data are temporarily stored in a frame buffer or the like, and the image data stored are subjected to enlarging or reducing process. This means that there is needed a unit for enlarging/reducing process that is separate from a decoding unit, thus increasing the scale of the image processing apparatus as a whole. Another problem is that, since the enlarging/reducing process is effected after the encoded data are decoded, time required for data processing tends to be relatively long.

SUMMARY OF THE INVENTION

Accordingly, it is an object of the present invention to provide an image processing apparatus capable of efficiently enlarging or reducing an image obtained by decoding encoded data, without requiring any additional unit.

In order to achieve the above object, the present invention provides an image processing apparatus for decoding encoded data so as to obtain image data by using inverse cosine transform, comprising:

first transforming means for transforming encoded data into discrete cosine transform coefficient data segmented into processing blocks, each block being formed of a matrix of m×n pixels;

setting means for setting the values of M and N defining the size of a matrix forming each processing block used in inverse discrete cosine transform;

data preparing circuit for adding discrete cosine transform coefficient data having the value of 0 to, or deleting discrete cosine transform coefficient data having the value of 0 from, a high-frequency domain of the discrete cosine transform coefficient data obtained by the first transforming means and segmented into processing blocks, each block being formed of a matrix of m×n pixels, and for preparing discrete cosine transform coefficient data segmented into processing blocks, each block being formed of a matrix of M×N pixels, and the values of M and N being set by means of the setting means;

second transforming means for subjecting the discrete cosine transform coefficient data prepared by the data preparing circuit and segmented into processing blocks, each block being formed of a matrix of M×N pixels, to inverse discrete cosine transform, so that image data can be output; and outputting means for outputting image data output from the second transforming means and segmented into processing blocks as continuous image data.

In the image processing apparatus of the present invention, encoded data are obtained such that image data segmented into processing blocks, each block being formed of a matrix of m×n pixels, are encoded by means of discrete cosine transform. When the encoded data are decoded into image data, the encoded data are transformed into discrete cosine transform coefficient data segmented into processing blocks by means of the first transforming means, each block being formed of a matrix of m×n pixels. The data preparing circuit adds discrete cosine transform coefficient data having the value of 0 to, or deletes discrete cosine transform coefficient data having the value of 0 from, a high-frequency domain of the discrete cosine transform coefficient data obtained by the first transforming means and segmented into processing blocks, each block being formed of a matrix of m×n pixels, and prepares discrete cosine transform coefficient data segmented into processing blocks, each block being formed of a matrix of M×N pixels, and the values of M and N being set by means of the setting means. The second transforming means subjects the discrete cosine transform coefficient data prepared by the data preparing circuit and segmented into processing blocks, each block being formed of a matrix of M×N pixels, to inverse discrete cosine transform, so that image data can be output. The outputting means outputs image data output from the second transforming means and segmented into processing blocks as continuous image data.

Other objects and further features of the present invention will be apparent from the following detailed description when read in conjunction with the accompanying drawings.

BRIEF DESCRIPTION OF THE DRAWINGS

FIG. 6 is a circuit diagram of the M×N block data preparing circuit 12 shown in FIG. 3;

FIG. 7A shows the result of enlarging an original image in accordance with the decoding process of the present invention; and FIG. 7B shows the result of reducing the original image in accordance with the decoding process of the present invention.

DESCRIPTION OF THE PREFERRED EMBODIMENT

When the encoded data are decoded in the image processing apparatus of the present invention, the DCT coefficient data segmented into processing blocks are prepared, each block being formed of a matrix of M×N pixels, by adding DCT coefficient data having the value of 0 to, or deleting DCT coefficient data having the value of 0 from, the high-frequency domain of the discrete cosine transform coefficient data segmented into processing blocks, each block being formed of a matrix of m×n pixels, which matrix is the same as that used in the encoding process. The prepared DCT coefficient data are subjected to inverse cosine transform so that the image data segmented into blocks are obtained, each block being formed of a matrix of M×N pixels. By performing the above decoding process, the size of the pixel matrix for the image data obtained by executing inverse discrete cosine transform can be changed so that the enlarging/reducing of the image displayed in the display unit can be effected.

Figure 1:
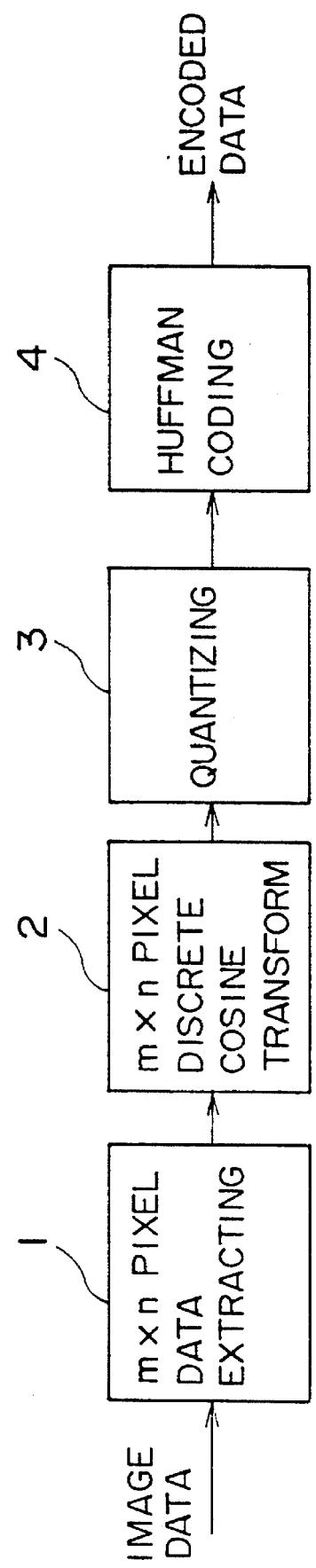
FIG. 1 is a block diagram showing the functions performed in encoding image data by an image processing apparatus.
Figure 2:
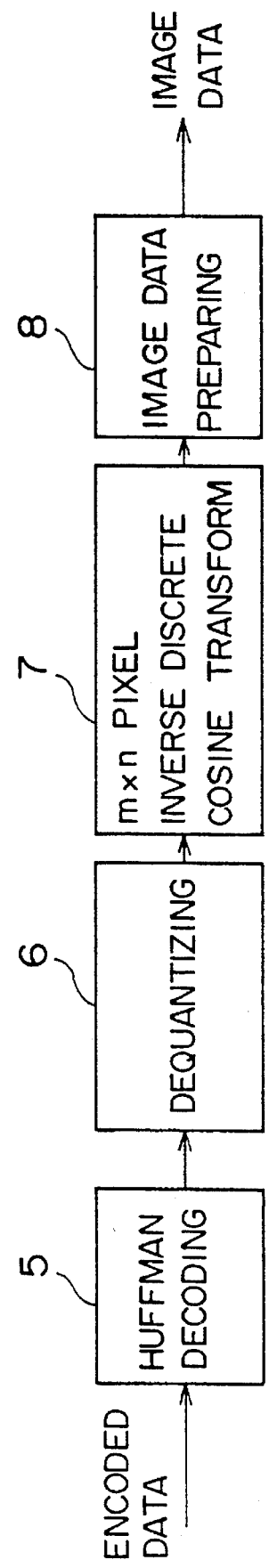
FIG. 2 is a block diagram showing the functions performed in decoding the encoded data.
Figure 3:
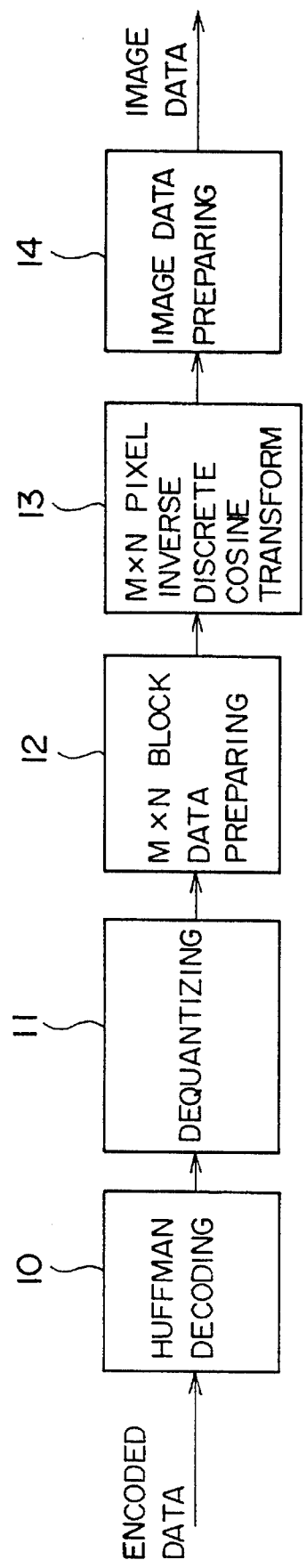
FIG. 3 is a block diagram showing the functions provided in the decoding part in the image processing apparatus of the present invention.

FIG. 3 is a block diagram showing the functions of the decoding part for decoding the encoded data. The decoding part comprises: a Huffman decoding circuit 10 for decoding the encoded data by using Huffman decoding; a dequantizing circuit 11 for dequantizing the quantized DCT coefficients obtained by Huffman decoding; an M×N processing block data preparing circuit 12 to be described in detail later; an M×N pixel inverse discrete cosine transform circuit 13 for subjecting DCT coefficient data in processing blocks obtained by the M×N processing block data preparing circuit 12 to inverse discrete cosine transform, each block being formed of a matrix of M×N pixels; an image data preparing circuit 14 for outputting, as continuous image data, the image data in processing blocks obtained by inverse discrete cosine transform to a display unit or the like.

The M×N block data preparing circuit 12 segments the DCT coefficient data obtained by the dequantizing circuit 11 into processing blocks, each block being formed of a matrix of m×n pixels, so as to obtain the DCT coefficient data in processing blocks. Then the M×N block data preparing circuit 12 adds zero signals to or deletes zero signals from, the high-frequency domain of the DCT coefficient data in processing blocks so that the processing blocks are resized to be formed of an M×N matrix. The DCT coefficient data thus altered are output from the M×N block data preparing circuit 12. The size (M×N) of new matrices can be by a user via an operation panel. For example, when the user desires to have double the size of an image displayed on the display unit, the values of M and N are set to be double those of m and n, respectively. When the image size is to be halved, the values of M and N are set to be half those of m and n, respectively.

In the conventional image processing apparatus, when the enlarging/reducing of image data is to be executed, the decoded data are temporarily stored in a frame buffer memory or the like, and the image data thus stored are subjected to enlarging/reducing process. The present invention is unique in that processing blocks are resized, resulting in a block formed of a matrix of M×N pixels instead of a matrix of m×n pixels used in encoding the image data (see FIG. 5). The DCT coefficient data altered in terms of the block size are subjected to inverse discrete cosine transform, and the enlarging/reducing process is executed by changing the quantity of image data in processing blocks obtained by inverse discrete cosine transform. When the relationships m=M and n=N are satisfied, the image data on the same scale as the original data can be obtained.

Figure 5B:
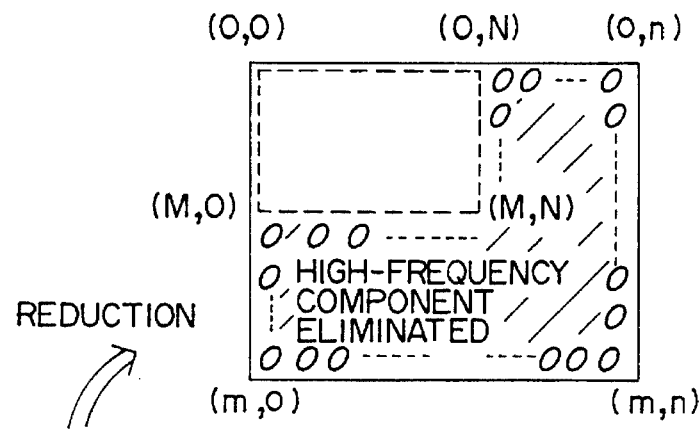
FIG. 5B shows how the DCT coefficient data in the high-frequency component area in the processing block are eliminated.
Figure 5A:
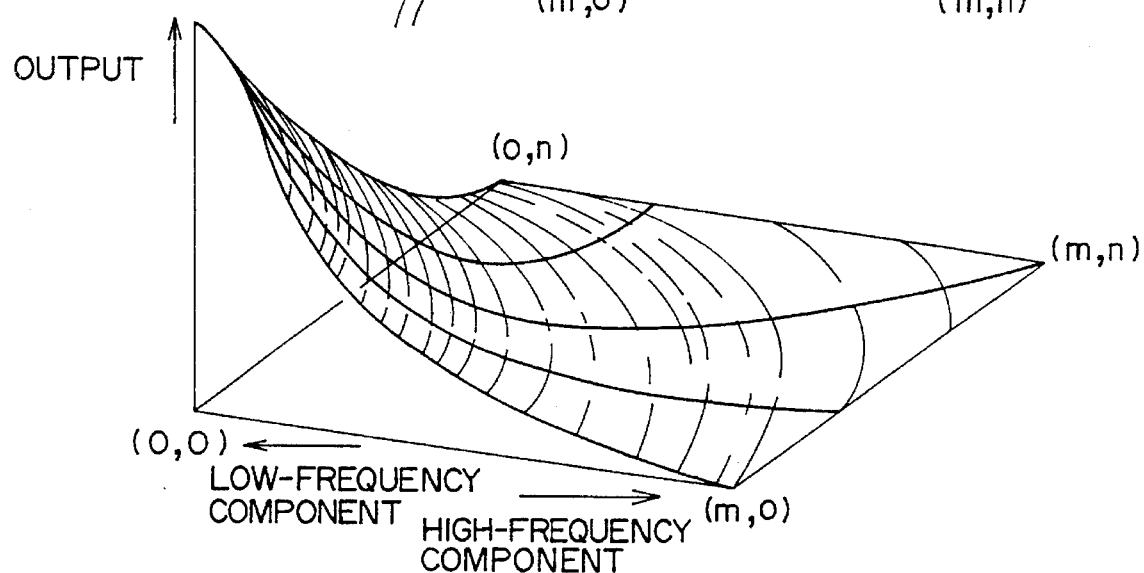
FIG. 5A shows the distribution of DCT coefficients in a processing block.
Figure 5C:
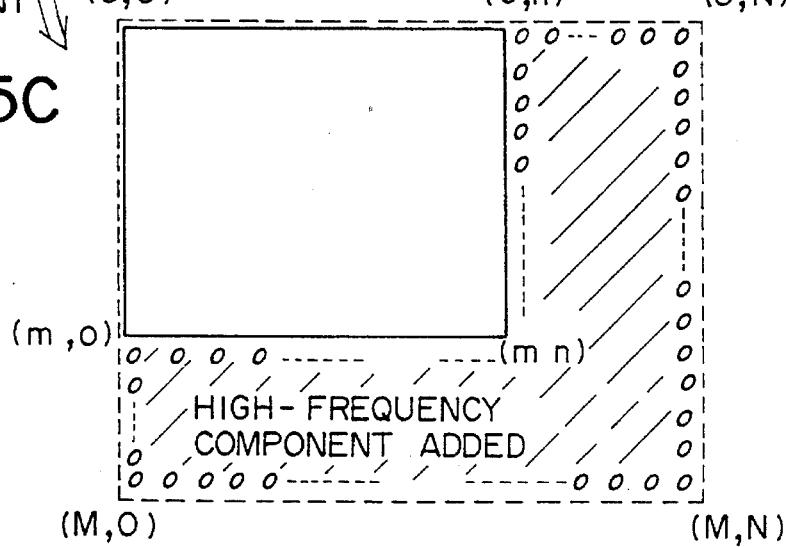
FIG. 5C shows how DCT coefficient data are added to the high-frequency component area.

FIG. 5a shows a power spectrum of the DCT coefficient data in processing blocks, each block being formed of a matrix of m×n pixels; FIGS. 5b and 5c show the preparation of the DCT coefficient data composed of M×N pixel matrices, by adding coefficient data having the value 0 to, or deleting coefficient data having the value 0 from, the high-frequency component domain of the DCT coefficient data.

Figure 4A:
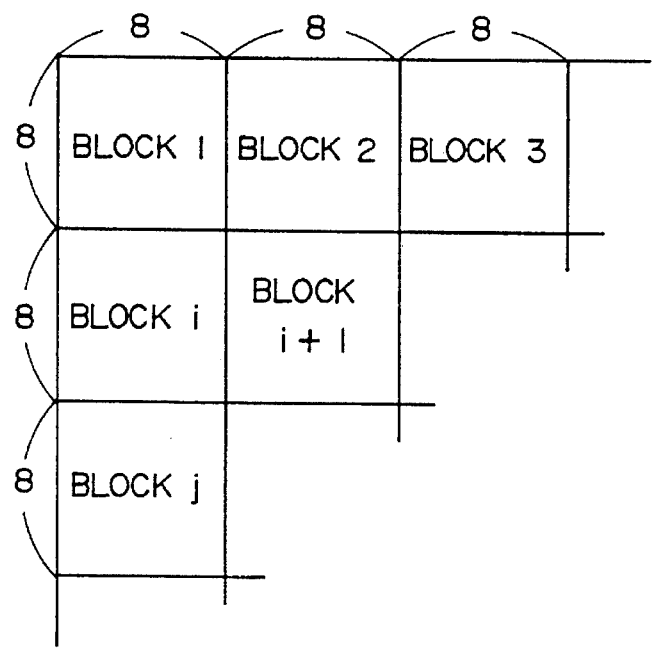
FIG. 4A shows the segmentation of image data into processing blocks formed of 8×8 pixel matrices.
Figure 4B:
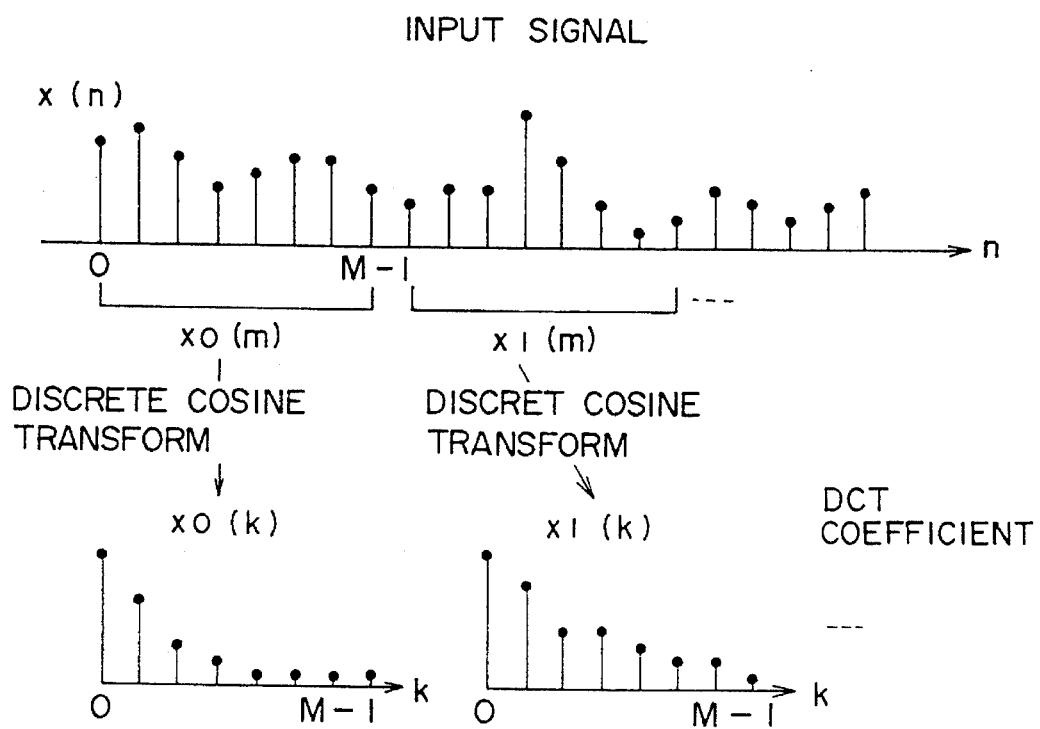
FIG. 4B shows, in the upper half, the image data contained in the processing blocks, and shows, in the lower half, the DCT coefficient data obtained by subjecting the image data, contained in the processing blocks and shown in the upper half, to discrete cosine transform.

By subjecting the encoded data to Huffman decoding, and by dequantizing the quantized DCT coefficients obtained in the decoding process, DCT coefficient data having spatial frequencies shown in the lower half of FIG. 4b are obtained. The DCT coefficients have the power spectrum as shown in FIG. 5a. When the image data are to be reduced, DCT coefficient data for the high-frequency component domain outside the domain whose size is defined by M×N (where M<m and N<n) are eliminated so that the processing blocks are resized, as shown in FIG. 5b. When the image data are to be enlarged, DCT coefficient data having the value 0 are added to the high-frequency component domain of the m×n processing blocks, as shown in FIG. 5c so that the M×N processing blocks are obtained (where M>m and N>n). In this manner, the processing blocks which are subjected to inverse discrete cosine transform can be resized as required so that the size of the image obtained by the decoding process can be enlarged or reduced as required.

FIG. 6 is a circuit diagram of the M×N block data preparing circuit 12 shown in FIG. 3. The circuit 12 comprises: registers 100 and 109; counters 102 and 106; comparators 101 and 107; a load signal generating circuit 103; a shift register 104; a selector 105; and a clock signal generator 108.

The circuit 12 is fed by the DCT coefficient data in processing blocks having the size m×n, the values of m and n defining the size of the processing blocks used in encoding the image data, and the values of M and N defining the size of the processing blocks used in the decoding process. It is assumed here, for example, that the value of m is fixed to be 8 and the value of n is fixed to be 8. It is also assumed that the values of M and N are set by a user via an operation panel (not shown). The value of M defining the size of the processing block is input to the register 100 and retained therein. The value of N also defining the size of the processing block is input to the register 109 and held therein. The DCT coefficient data are input to the selector 105. The selector 105 reads the input DCT coefficient data and outputs the read data, when a selection signal input from the comparator 101 or the comparator 107 is at a low level. The selector 105 stops reading the DCT coefficient data and outputs a zero signal instead when the selection signal is at a high level. The shift register 104 is fed by the data signal via the selector 105 in the parallel manner, and outputs the same in the serial manner, in synchronization with a clock signal output from the clock signal generating circuit 108. The counter 102 counts the number of lines of the DCT coefficient data output from the shift register 104. The counter 106 counts the number of bits of the DCT coefficient data output from the shift register 104, on the basis of the clock signal output from the clock signal generating circuit 108.

The comparator 101 compares the count of the counter 102 with the values of M and m defining the size of the respective processing blocks. If the count of the counter 102 exceeds the value of m, the comparator 101 outputs the high-level selection signal to the selector 105. If the count of the counter 102 exceeds the value of M, the comparator 101 outputs a read stop signal to the selector 105 and sends a reset signal to the counter 102. Upon receipt of the reset signal from the comparator 102, the count of the counter 102 is reset.

In the case in which the value of M defining the size of the processing blocks used in the decoding process is smaller than the value of m defining the size of the processing blocks used in the image data encoding process, the comparator 101 outputs the read stop signal to the selector 105 when the count of the counter 101 has reached M. In the case in which the value of M defining the size of the processing blocks used in the decoding process is greater than the value of m defining the size of the processing blocks used in the encoding process, the comparator 101 outputs the high-level selection signal to the selector 105 when the count of the counter 102 exceeds the value of m, so as to switch the data signal output from the selector 105 to the zero signal. The comparator 101 outputs the read stop signal to the selector 105 when the count of the counter 102 has reached the value of M.

The comparator 107 compares the count of the counter 106 with the values of N and n defining the size of the respective processing blocks. If the count of the counter 106 exceeds the value of n, the comparator 107 outputs the high-level selection signal to the selector 105. If the count of the counter 106 exceeds the value of N, the comparator 107 outputs the read stop signal to the selector 105, and sends a control signal to the load signal generating circuit 103. The load signal generating circuit 103, upon receipt of the control signal from the comparator 107, outputs the load signal to the counters 102, 106 and the shift register 104. Upon receipt of the load signal, the shift register 104 reads the data input from the selector 105. Upon receipt of the load signal, the counter 102 increments the count thereof by one. Upon receipt of the load signal, the counter 106 resets the count.

Thus, in the case in which the value of N defining the size of the processing blocks used in the decoding process is smaller than the value of n defining the size of the processing blocks used in encoding the image data, the comparator 107 outputs the read stop signal to the selector 105 when the count of the counter 106 exceeds the value of N. In the case in which the value of N defining the size of the processing blocks used in the decoding process is greater than the value of n defining the size of the processing blocks used in the encoding process, the comparator 107 outputs the high-level selection signal to the selector 105 when the count of the counter 106 exceeds the value of n, so as to switch the data signal output from the selector 105 to the zero signal. The comparator 107 outputs the read stop signal to the selector 105 when the count of the counter 102 has reached the value of N.

By configuring the circuit in the above manner, the DCT coefficient data in processing blocks of M×N pixel matrices as shown in FIG. 5b or FIG. 5c can be obtained.

In the left half of FIGS. 7a and 7b, original images are shown. In the right half of FIG. 7a, a reproduced image on an enlarged scale is shown. In the right half of FIG. 7b, a reproduced image on a reduced scale is shown. The reproduced images are obtained by subjecting the encoded data obtained by encoding the image data for the original images to the decoding process of the present invention.

Referring to FIG. 7a, the encoded image on the right is obtained such that the values of m and n defining the size of the processing blocks constructing the image area in which the letter A is displayed are doubled by using the data preparing circuit 12, and such that the DCT coefficients in the processing blocks having four times the area of the original blocks are subjected to inverse discrete cosine transform.

Referring to FIG. 7b, the reduced image on the right is obtained such that the size of the processing blocks is halved both lengthwise and breadthwise by the data preparing circuit 12, and the DCT coefficient data in processing blocks having ¼ the area of the original blocks are subjected to inverse discrete cosine transform.

It is also possible to have images enlarged or reduced to different scales displayed on a display area, by specifying a plurality of types of processing blocks having different sizes when subjecting the encoded data to the decoding process using inverse discrete cosine transform.

As has been described, the image processing apparatus of the present invention makes it possible to obtain the DCT coefficient data in resized processing blocks derived from resizing the processing blocks used in encoding the image data, and to enlarge or reduce the image to be displayed on the display unit or the like by subjecting the DCT coefficient data in resized processing blocks to inverse discrete cosine transform.

The present invention is not limited to the above described embodiments, and variations and modifications may be made without departing from the scope of the present invention.

What is claimed is:

1. An image processing apparatus for decoding encoded data so as to output continuous image data, the apparatus comprising:

a) first transforming means for transforming the encoded data into first processing blocks of discrete cosine transformation (DCT) coefficient data, each first processing block including a matrix of m×n pixels;

b) setting means for setting values of M and N;

c) a data preparing circuit including:
1) means for adding DCT coefficient data having the value of 0 to, or for deleting DCT coefficient data having the value of 0 from, a high-frequency domain of the DCT coefficient data from the first transforming means; and
2) means for preparing second processing blocks of DCT coefficient data, each second processing block including a matrix of M×N pixels;

wherein the adding and preparing means collectively include:

A) a first register for receiving and storing the value of M;

B) a second register for receiving and storing the value of N;

C) a first counter for counting a number of lines of DCT coefficient data output from a shift register;

D) a second counter for counting a number of bits of DCT coefficient data output from the shift register;

E) a first comparator for comparing a count of the first counter with the values of M and m, and for outputting a high-level selection signal, or a read stop signal and a counter reset signal, depending on a first result of comparison;

F) a second comparator for comparing a count of the second counter with the values of N and n, and for outputting a high-level selection signal, or a read stop signal and a control signal, depending on a second result of comparison;

G) a load signal generating circuit for outputting a load signal to the first and second counters and to the shift register, upon receipt of the control signal from the second comparator;

H) the shift register for receiving a parallel data signal via a selector and for outputting the same data signal serially as the image data in the second blocks of M×N pixels, in synchronization with a clock signal output from a clock signal generating circuit;

I) the selector for receiving DCT coefficient data in the first processing blocks of m×n pixel matrices, and including means for reading and outputting the same DCT coefficient data when the selection signal input from the first or second comparator is at a low level, and for stopping reading the DCT coefficient data and for outputting a zero signal when the selection signal is at a high level; and J) the clock signal generator for generating the clock signal used by the shift register and the first and second counters;

d) second transforming means for subjecting the DCT coefficient data in the second processing blocks to inverse discrete cosine transformation, to provide image data; and e) outputting means for outputting the image data as the continuous image data.

* * * * *

UNITED STATES PATENT AND TRADEMARK OFFICE
CERTIFICATE OF CORRECTION

PATENT NO. : 5,453,788
DATED : September 26, 1995
INVENTOR(S) : Makoto MATSUSHIMA et al.

It is certified that error appears in the above-indentified patent and that said Letters Patent is hereby corrected as shown below:

On the title page: Item[54] and Column 1, line 4

--APPARATUS FOR CONVERTING ENCODED DATA INTO IMAGE DATA, INCLUDING DATA PREPARING CIRCUIT FOR ADDING OR DELETING DCT COEFFICIENT DATA IN HIGH FREQUENCY PORTION OF BLOCKS OF DCT COEFFICIENT DATA BEFORE INVERSE DCT TRANSFORMATION, TO ALLOW ENLARGEMENT OR REDUCTION OF IMAGE--

Signed and Sealed this

Twenty-first Day of November, 1995

Attest:

BRUCE LEHMAN

Attesting Officer

Commissioner of Patents and Trademarks